US007636312B2

(12) United States Patent
Lee et al.

(10) Patent No.: US 7,636,312 B2
(45) Date of Patent: *Dec. 22, 2009

(54) APPARATUS AND METHOD FOR MOVING A RECEIVE WINDOW IN A RADIO ACCESS NETWORK

(75) Inventors: Young-Dae Lee, Gyeonggi-Do (KR); Seung-June Yi, Seoul (KR); So-Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 48 days.

This patent is subject to a terminal disclaimer.

(21) Appl. No.: 11/771,985

(22) Filed: Jun. 29, 2007

(65) Prior Publication Data

US 2007/0268932 A1 Nov. 22, 2007

Related U.S. Application Data

(63) Continuation of application No. 10/703,255, filed on Nov. 6, 2003.

(30) Foreign Application Priority Data

Nov. 7, 2002 (KR) ............... 2002-68909

(51) Int. Cl.
*H04L 12/56* (2006.01)
(52) U.S. Cl. .................................. 370/235
(58) Field of Classification Search ........... None
See application file for complete search history.

(56) References Cited

U.S. PATENT DOCUMENTS

| 4,841,526 A | 6/1989 | Wilson et al. |
|---|---|---|
| 5,007,051 A | 4/1991 | Dolkas et al. |
| 6,519,223 B1 | 2/2003 | Wager et al. |
| 6,614,807 B1 * | 9/2003 | Mikkila ............. 370/469 |
| 6,687,248 B2 * | 2/2004 | Jiang ............... 370/394 |
| 6,922,393 B2 * | 7/2005 | Jiang et al. ......... 370/236 |
| 6,978,413 B2 * | 12/2005 | Han ................. 714/749 |
| 7,310,336 B2 * | 12/2007 | Malkamaki ......... 370/392 |

(Continued)

FOREIGN PATENT DOCUMENTS

EP 0310360 4/1989

(Continued)

OTHER PUBLICATIONS

3GPP "UMTS, Radio Link Control (RLC) protocol specification" ETSI TS 125 322 v4.3.0, Dec. 2001.

(Continued)

*Primary Examiner*—Anh-Vu H Ly
(74) *Attorney, Agent, or Firm*—Lee, Hong, Degerman, Kang & Waimey

(57) ABSTRACT

A method of moving a receiving window in a wireless mobile communication system, wherein the AM RLC of the transmitting side sends information of the last discarded SDU regardless of continuity of the discarded SDUs. The AM RLC of the receiving side checks whether all SDUs from the start point of the receiving window up to the last discarded SDU are successfully received, delivers the SDUs that are successfully received to an upper layer, and discard only those SDUs that are not successfully received.

17 Claims, 10 Drawing Sheets

U.S. PATENT DOCUMENTS

| | | | |
|---|---|---|---|
| 7,414,974 B2* | 8/2008 | Kim, Young Lak | 370/236 |
| 7,532,626 B2* | 5/2009 | Leppanen et al. | 370/394 |
| 2001/0030965 A1 | 10/2001 | Tourunen et al. | |
| 2002/0041567 A1 | 4/2002 | Yi | |
| 2002/0089984 A1 | 7/2002 | Jiang | |
| 2002/0090005 A1 | 7/2002 | Jiang et al. | |
| 2002/0142731 A1* | 10/2002 | Jiang | 370/394 |
| 2003/0147396 A1* | 8/2003 | Jiang | 370/394 |
| 2004/0160937 A1* | 8/2004 | Jiang | 370/349 |
| 2006/0098574 A1* | 5/2006 | Yi et al. | 370/236 |
| 2007/0086411 A1* | 4/2007 | Wu | 370/346 |

FOREIGN PATENT DOCUMENTS

| | | |
|---|---|---|
| EP | 0954142 | 4/1998 |
| EP | 1085687 | 3/2001 |
| EP | 1198107 A2 | 4/2002 |
| JP | 2003-249974 | 9/2003 |
| KR | 10-2002-0014940 A | 2/2002 |
| KR | 10-2002-0028098 A | 4/2002 |
| KR | 10-2002-0088225 A | 11/2002 |
| RU | 2146420 | 3/2000 |
| WO | WO 00/60799 | 10/2000 |
| WO | WO 01/60017 | 8/2001 |
| WO | WO 02/15510 | 2/2002 |

OTHER PUBLICATIONS

3GPP "Technical Specification Group Radio Access Network; Radio Link Control (RLC) protocol specification" TS 25.322 v5.0.0, Mar. 2002.

3rd Generation Partnership Project (3GPP); "3rd Generation Partnership Project; Technical Specification Group Terminals; User Equipment (UE) conformance specification; Part 1: Protocol conformance specification (Release 5) "; Technical Specification; 3GPP TS 34.123-1 V5.1.1 (2002-09); Sept. 20, 2002; XP050122248.

LG Electronics Inc., "Enhancement of MRW Procedure ", 3GPP TSG-RAN WG2 Meeting #33; R2-022919; Nov. 12, 2002; XP050122426.

LG Electronics Inc., "Enhancement of MRW Procedure "; Change Request 25.322 V5.3.0; 3GPP TSG-RAN WG2 Meeting #34; R2-030562; Feb. 17, 2003; XP050123179.

Brill, M; "Die Anwendernahen Schichten IM ISO/OSI-Modell " Elektronik, vol. 37, No. 5, Mar. 4, 1988, pp. 77-78,80-82, XP000814361, ISSN: 0013-5658.

"The Layered Approach: The OSI Model "; Data and Computer Communications; 1991; pp. 446-456; XP000917810.

\* cited by examiner

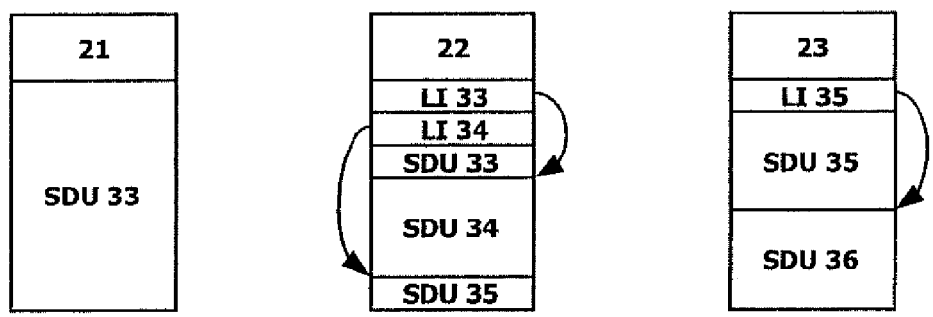

FIG.6
BACKGROUND ART

| Number of PDU SNs included in MRW command |
|---|
| PDU SN where end portion of 1st SDU exists (Optional) |
| PDU SN where end portion of 2nd SDU exists (Optional) |

⊙
⊙

| PDU SN where end portion of (N-1)th SDU exists (Optional) |
|---|
| PDU SN where end portion of Nth SDU exists |
| Indicator indicating end of Nth SDU in PDU where end portion of Nth SDU exists |

FIG.7
BACKGROUND ART

| Number of PDU SN |
|---|
| PDU SN=23(Discard information of SDU 35) (Optional) |
| PDU SN=25(Discard information of SDU 36) |
| Indicator indicating end of SDU 36 in PDU 25 |

FIG.9
BACKGROUND ART
| SDU | 33 | 34 | 35 | 36 | 37 | 38 | 39 | 40 | 41 | 42 | 43 | 44 |
|---|---|---|---|---|---|---|---|---|---|---|---|---|
| PDU | 21 | 22 | 23 | 24 | 25 | 26 | 27 | 28 | 29 | 30 | 31 | 32 | 33 | 34 |
|---|---|---|---|---|---|---|---|---|---|---|---|---|---|---|
 Successfully transmitted PDU and SDU
 Transmission-failed PDU and SDU
 Not-transmitted PDU and SDU(a part of SDU 44 is transmitted)

APPARATUS AND METHOD FOR MOVING A RECEIVE WINDOW IN A RADIO ACCESS NETWORK

CROSS-REFERENCE TO RELATED APPLICATIONS

This application is a continuation of U.S. application Ser. No. 10/703,255, filed Nov. 6, 2003, which pursuant to 35 U.S.C. § 119(a), claims the benefit of earlier filing date and right of priority to the Korean Application No. 2002-68909, filed on Nov. 7, 2002, the contents of which are hereby incorporated by reference herein in their entirety.

BACKGROUND OF THE INVENTION

1. Field of the Invention

The present invention relates to radio link control (RLC) data transmission in a UMTS (universal mobile telecommunications system), and more particularly, to a method for moving a receive window in a radio access network.

2. Background of the Related Art

A universal mobile telecommunication system (UMTS) is a third generation mobile communication system that has evolved from a European standard known as Global System for Mobile communications (GSM) that aims to provide an improved mobile communication service based upon a GSM core network and wideband code division multiple access (W-CDMA) wireless connection technology.

In December 1998, the ETSI of Europe, the ARIB/TTC of Japan, the T1 of the United States, and the TTA of Korea formed a Third Generation Partnership Project (3GPP), which is creating the detailed specifications of the UMTS technology.

Within the 3GPP, in order to achieve rapid and efficient technical development of the UMTS, five technical specification groups (TSG) have been created for performing the standardization of the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates a structure of a radio interface protocol between a terminal and the UTRAN according to the 3GPP radio access network standards.

Referring to FIG. 1, a radio interface protocol has horizontal layers comprising a physical layer, a data link layer, and a network layer, and has vertical planes comprising a user plane for transmitting user data and a control plane for transmitting control information.

The user plane is a region that handles traffic information of the user, such as voice and Internet protocol (IP) packets, while the control plane is a region that handles control information for an interface of a network, maintenance and management of a call, and the like.

The protocol layers in FIG. 1 can be divided into a first layer (L1), a second layer (L2), and a third layer (L3) based on the three lower layers of an open system interconnection (OSI) standard model. Each layer will be described in more detail as follows.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer send and receive data with one another via the transport channel.

The second layer (L2) includes a MAC layer, a radio link control (RLC) layer, a broadcast/multicast control (BMC) layer, and a packet data convergence protocol (PDCP) layer.

The MAC layer provides an allocation service of the MAC parameters for allocation and re-allocation of radio resources. The MAC layer is connected to an upper layer called the radio link control (RLC) layer, via a logical channel.

Various logical channels are provided according to the kind of transmitted information. In general, when information of the control plane is transmitted, a control channel is used. When information of the user plane is transmitted, a traffic channel is used.

The RLC layer supports reliable data transmissions, and performs a segmentation and concatenation function on a plurality of RLC service data units (RLC SDUs) delivered from an upper layer. When the RLC layer receives the RLC SDUs from the upper layer, the RLC layer adjusts the size of each RLC SDU in an appropriate manner upon considering processing capacity, and then creates certain data units with header information added thereto. The created data units are called protocol data units (PDUs), which are then transferred to the MAC layer via a logical channel. The RLC layer includes a RLC buffer for storing the RLC SDUs and/or the RLC PDUs.

The PDCP (Packet Data Convergence Protocol) layer, as a higher layer of the RLC layer, allows the data transmitted through a network protocol (such as an IPv4 or IPv6) to be effectively transmitted on a radio interface with a relatively small bandwidth. To achieve this, the PDCP layer performs the function of reducing unnecessary control information used for a wired network, and this type of function is called, header compression.

A BMC (broadcast/multicast control) layer transmits cell broadcast messages (hereinafter abbreviated as 'CB message') transferred from a core network to terminals through a radio interface. For this, the BMC layer performs the functions of storing, scheduling, and transmitting the CB messages.

There is a radio resource control (RRC) layer at a lower-most portion of the L3 layer. The RRC layer is defined only in the control plane, and handles the controlling of logical channels, transport channels, and physical channels with respect to setting, resetting, and releasing of radio bearers. The radio bearer service refers to a service that the second layer (L2) provides for data transmission between the terminal and the UTRAN, and in general, setting the radio bearer refers to defining the protocol layers and the channel characteristics of the channels required for providing a specific service, as well as respectively setting substantial parameters and operation methods.

For reference, the PDCP and BMC layers exist in the user plane only, while the MAC and RLC layers can exist in the user plane or the control plane according to the upper layer connected thereto. Namely, when the RLC layer provides services to the RRC layer, the MAC and RLC layers exist in the control plane. Otherwise, they exist in the user plane.

Moreover, the other the second layers (excluding the MAC layer) have a plurality of entities to guarantee the QoS (quality of service) that is appropriate for each radio bearer (RB). Namely, a multitude of entities can exist in one layer, and each entity provides a separate service.

The RLC layer will be explained in more detail as follows. A basic function of the RLC layer is to guarantee the QoS of each RB and their corresponding data transmissions. As the RB service is a service that the second layer of the radio protocol provides to higher layers, the entire second layer affects the QoS, and in particular, the RLC layer has significant influence to the QoS.

The RLC provides an independent RLC entity for each RB in order to guarantee the particular QoS of the RB, and provides three RLC modes, namely, a transparent mode (TM), an unacknowledged mode (UM), and an acknowledged mode (AM) to support various types of QoS. As the three RLC modes (TM, UM, AM) respectively support different QoS requirements, there are differences in operation and in specific functions. Accordingly, each operational mode of the RLC must be considered in more detail. The particular RLC for each mode will be referred to as TM RLC, UM RLC, and AM RLC.

In TM, employing a TM RLC, no protocol overhead is added to the RLC SDU that is transferred from higher layer. As the RLC lets the SDU pass "transparently," this mode is called transparent mode (TM). Accordingly, the user plane and the control plane perform the following functions. In the user plane, because a data processing time at the RLC is short, real-time circuit data transmissions (such as voice and streaming in the circuit service domain (CS domain)) are handled. In the control plane, because there is no protocol overhead within the RLC, uplink transmission of RRC messages from an unspecified terminal (UE), and downlink transmission of RRC messages that are broadcast to all terminals (UE) within a cell are handled.

Meanwhile, unlike the transparent mode, a mode in which protocol overhead is added at the RLC is called non-transparent mode. Non-transparent mode is divided into unacknowledged mode (UM) that has no reception acknowledgement for the transferred data, and acknowledged mode (AM) that has acknowledgement. In UM, employing a UM RLC, a PDU header including a sequence number (SN) is added to each PDU and then transferred, in order to allow the receiving side to identify which PDUs were lost during transmission. As such, in UM (employing a UM RLC), the user plane handles broadcast/multicast data transmissions or real-time packet data transmissions, such as voice (e.g., VoIP) and streaming in the packet service domain (PS domain). In the control plane, transmission of those RRC messages that need no acknowledgement response, among all RRC messages delivered to a specific terminal or terminal group within a cell region, is handled.

As in UM, in AM (employing an AM RLC) a PDU header including SN is added to construct a PDU. However, unlike the UM, in AM, a receiving side provides reception acknowledgement of the PDU sent from a transmitting side. In AM, the receiving side provides acknowledgement in order to request re-transmission of any PDUs that have not been properly received. This function of re-transmission is the most distinguishing characteristic in AM RLC. Thus, the object of AM RLC is to guarantee error-free data transfers through re-transmissions. To achieve this object in AM (employing an AM RLC), transmission of non-real-time packet data such as TCP/IP in the PS domain is handled by the user plane, and transmission of RRC messages that absolutely need acknowledgement, among all the RRC messages transmitted to a specific terminal, is handled by the control plane.

Considering the direction of data communication, TM RLC and UM RLC are used in uni-directional communication, while AM RLC is used in bi-directional communication because of the necessary feedback (acknowledgement) from a receiving side. Bi-directional communication is mainly used in point-to-point communication, whereby AM RLC uses dedicated logical channels only. Regarding the structural differences, in AM RLC, a single RLC entity performs both transmission and reception, whereas in TM RLC and UM RLC, a RLC entity exists at the transmission side and a RLC entity exists at the reception side.

The AM RLC requires a more complicated structure and data-processing techniques due to the re-transmission function. In AM RLC, a re-transmission buffer is required in addition to a transmission buffer to manage re-transmission. The AM RLC performs various functions, such as using a "transmitting/receiving window" for flow control, performing "Polling" in which the transmitting side requests status information from a peer RLC entity at the receiving side, providing a "status report" in which the receiving side reports its buffer status to a peer RLC entity at the transmitting side, creating a "status PDU" for carrying status information, performing "Piggyback" in which a status PDU is inserted into a data PDU to increase data transmission efficiency, and the like. Moreover, the AM RLC needs various protocol parameters, state variables, and a timer to support its various functions.

One of the main functions of a RLC is the SDU discard function, whereby certain RLC SDUs (such as "old" SDUs), among the SDUs stored at the transmitting side RLC entity, are discarded to prevent overloading of the RLC buffer. The SDU discard function plays a significant role in guaranteeing the QoS of a RB service provided by the RLC. Typically, the transmitting side discards certain SDUs by using scheme employing a timer or a scheme employing a limited number of re-transmissions.

The timer scheme is used in all three kinds of RLC modes (TM, UM, and AM). A transmitting side RLC entity operates a timer (e.g., a discard time) for measuring the time (duration) that each RLC SDU remains at the RLC layer, each RLC SDU being received from an upper layer. If a particular SDU fails to be properly transmitted upon expiration of time period set by the timer, that SDU is discarded and all SDUs between the beginning of a transmitting window and the corresponding SDU are discarded as well.

The limited number of re-transmissions scheme is used in AM RLC only. If the transmission and re-transmission of a particular RLC PDU continue to be unsuccessful and the maximum (limit) number of re-transmissions is reached, a transmitting side RLC entity discards any SDU that includes at least a portion of the corresponding RLC PDU. This operation is described in more detail below.

The RLC SDU transferred down to the AM RLC layer at the transmitting side is converted into a RLC PDU to be stored in a buffer. At this time, a counter (e.g., VT (DAT)) for counting the number of transmissions for each RLC PDUs begins its count operation. The VT (DAT) is incremented by '1' each time the RLC PDU (that the VT (DAT) is responsible for) is transmitted. If the transmission of a particular RLC PDU continues to be unsuccessful, and the VT (DAT) reaches the maximum (limit) number of retransmissions (MaxDAT), the AM RLC discards all SDUs included in at least a portion of the corresponding PDU, as well as all SDUs between a beginning of a transmitting window and the corresponding SDU.

In case the transmitting side AM RLC discards at least one RLC SDU, such a discard is notified to the receiving side AM RLC so that the receiving window of the receiving side is moved. The receiving window can be moved because the receiving side no longer needs to stand by and wait for the SDU that has now been discarded and thus would not be transmitted. Here, this type of operation can be referred to as a 'Move Receiving Window (MRW)' function.

The transmitting side sends an MRW message to the receiving side for moving the receiving window. Here, the MRW command does not specify the location to which the receiving window should actually move to, but only provides information that a particular SDU has been discarded at the transmitting side. Upon receiving the MRW message, the receiving side appropriately moves the receiving window based on the information of the discarded SDU.

A procedure of moving a receiving window is called a MRW procedure. The MRW procedure includes the steps of transmitting a MRW command from the transmitting side, moving the receiving window by the receiving side and transmitting receiving window move information to the transmitting side, and moving the transmitting window at the transmitting side. The operation of each of these steps is explained in detail as follows. For better understanding, the explanation begins with the step performed by the transmitting side of receiving an SDU from a higher layer.

Construction of PDU from SDU

Once the SDUs are delivered from a higher layer, the transmitting side AM RLC performs segmentation and concatenation on the SDUs (which may be of different sizes) to construct an AM data (AMD) PDU having a predetermined size. The AMD PDU includes a header added to a payload. The payload consists of a portion of an SDU or at least one or more SDUs. The header consists of a sequence number (SN) of the PDU and a length indicator (LI) indicating the location of a boundary of the SDU if such boundary exists.

FIG. 2 shows an example of how PDUs are constructed from SDUs.

Referring to FIG. 2, it is assumed that the $1^{st}$ to $32^{nd}$ SDUs carried on the $1^{st}$ to $20^{th}$ PDUs have already been successfully transmitted. When subsequent SDUs are delivered down to the AM RLC, the AM RLC performs segmentation or concatenation on the SDUs (that may be of different sizes) to construct AMD PDUs of a predetermined size. In FIG. 2, only the $33^{rd}$ to $39^{th}$ SDUs are shown. However, it can be understood that additional SDUs may continue to be delivered and that the AM RLC continues to construct additional PDUs for the descending SDUs. Furthermore, the AM RLC attaches the SN of the PDU to the AMD PDU header. If a boundary of the SDU exists within a constructed PDU, an indicator LI indicating the location of the boundary is also added to the AMD PDU header.

FIG. 3 is an exemplary diagram of showing the processing of the $21^{st}$ to $23^{rd}$ AMD PDUs among the constructed AMD PDUs in FIG. 2.

Referring to FIGS. 2 and 3, it can be understood that the $21^{st}$ PDU consists of a portion of the $33^{rd}$ SDU (SDU 33), whereby no boundary of the $33^{rd}$ SDU (SDU 33) exists within the $21^{st}$ PDU. Hence, the $21^{st}$ PDU simply consists of an SN (in the header) and a portion of SDU 33. Next, the $22^{nd}$ PDU consists of an end portion of SDU 33, the entirety of SDU 34, and a beginning portion of SDU 35, whereby two SDU boundaries exist within the $22^{nd}$ PDU. Thus, two LI fields (LI 33 and LI 34) indicating the respective SDU boundaries are added to the header. For the $23^{rd}$ PDU, since one boundary between SDU 35 and SDU 36 exists within the $23^{rd}$ PDU, a corresponding LI field is added to the header.

PDU Storage

Each constructed AMD PDU is stored in a transmission buffer of the AM RLC, and simultaneously stored in a re-transmission buffer for possible re-transmission that may take place at a later time. The difference between the transmission and re-transmission buffers lies in that the PDU having been transmitted once is removed from the transmission buffer, but is stored in the re-transmission buffer until that PDU is successfully transmitted. FIG. 4 shows an example of how the AM RLC constructs and stores the AMD PDU in the transmission and re-transmission buffers.

PDU Transmission

The transmitting side AM RLC transmits the constructed PDUs to the receiving side AM RLC of the peer AM RLC entity. When the transmitting side AM RLC transmits AMD PDUs, all PDUs are not transmitted at once, as only those PDUs within a transmitting window can be transmitted. The reason that the AM RLC employs a transmitting window and a receiving window to transmit and receive PDUs is to manage those PDUs that need to be re-transmitted. For this, the transmitting side only transmits those PDUs in the transmitting window, and the receiving side only receives those PDUs in the receiving window. Here, a "window" represents a range of PDU SN values, whereby the PDUs in the receiving window refer to those PDUs having SN values within the range of PDU SN values corresponding to the receiving window.

The size of the transmitting/receiving window is set when the RLC entity is created, and its range (SN value range) varies while PDUs are transmitted and received. The start point and end point (i.e., boundaries) of the transmitting window and receiving window are defined as follows:

Transmitting Window
    Start point: the SN of the first PDU of which an ACK should be received next in-sequence from the receiving side.
    End point: the SN of the first PDU among the PDUs that cannot be transmitted.

Receiving Window
    Start point: the SN of the first PDU that must be received next in-sequence.
    End point: the SN of first PDU among the PDUs that cannot be received.

As can be seen from the above definitions, the transmitting side enables the transmission of only those PDUs having SNs within a range from the start point to the next-to-last end point ("endpoint-1"). The PDUs having SNs at and after the end point can be transmitted only after the transmitting window is updated. Updating of the transmitting window takes place when the ACK for the first in-sequence PDU is received from the receiving side.

In a similar manner, the receiving side enables the reception of only those PDUs having SNs within a range from the start point to the next-to-last end point ("endpoint-1"). If a PDU having an SN that is outside of such a range is received, the receiving side immediately discards such PDU. Updating of the receiving window takes place when the first in-sequence PDU is successfully received.

It should be noted that the size of the transmitting window and the receiving window is defined as the interval (size) between the start point and the end point. For example, assuming that the size of the transmitting/receiving window is 10 and the $1^{st}$ to $20^{th}$ PDUs have been successfully transmitted, the range of the transmitting window is 21~31, and also, the range of the receiving window is 21~31.

At the transmitting side, because the $21^{st}$ PDU is the first PDU of which an ACK should be received in-sequence, the transmitting window can be updated only if the successful transmission of the $21^{st}$ PDU is confirmed. Likewise, at the receiving side, because the $21^{st}$ PDU is the first PDU to be received in-sequence, the receiving window can be updated only if the successfully receiving of the $21^{st}$ PDU is confirmed.

If an endpoint of the transmitting/receiving window is 31, the transmitting side can only transmit the $21^{st}$ to $30^{th}$ PDUs. Accordingly, the receiving side can only receive the $21^{st}$ to 30$^{th}$ PDUs as well. The receiving side immediately discards any PDU having an SN that is out of range, as soon as such PDU is received. Updating of the transmitting window and the receiving window is continuously performed while the AMD PDUs are transmitted/received, as is shown in FIG. 5.

FIG. 5 shows an example for transmitting/receiving AMD PDUs and updating the transmitting window and the receiving window, in which all PDUs, up to the 20$^{th}$ PDU, are assumed to be successfully transmitted and both the transmitting window and the receiving window having a range of 21~31.

Referring to FIG. 5, a transmitting side constructs PDUs using the SDUs delivered from a higher layer and transmits the constructed PDUs to the receiving side. Here, the range of a transmitting window is 21~31, whereby only those PDUs within such a range are transmitted. The constructed PDUs are sequentially transmitted according to their SNs, and one or more PDUs can be transmitted within one transmission time interval (TTI). Although only the 21$^{st}$ to 28$^{th}$ PDUs are shown in FIG. 5, PDU transmission continues to take place, whereby additional PDUs can be further transmitted if they have SNs that fall within the range.

The receiving side waits for PDU reception with a receiving window having a range between 21~31. For those PDUs within the range, proper reception is possible. However, if a PDU that is outside the range is received, the receiving side regards such PDU as erroneous and thus immediately discards such PDU. Since the transmitting side sequentially transmits PDUs, the receiving side sequentially receives these PDUs as well. The receiving side updates the receiving window to a range of 22~32 once the 21$^{st}$ PDU is properly received. Thereafter, upon properly receiving the 22$^{nd}$ PDU, the receiving side updates the receiving window to 23~33. Namely, updating of the receiving window takes place only if a PDU that is supposed to be received in-sequence is properly received.

However, if the 24$^{th}$ PDU is received when the receiving window has been updated to 23~33, the receiving window will not be updated any further. Hence, the receiving side receives subsequent PDUs while the receiving window is fixed at a range of 23~33. FIG. 5 shows an example where the 23$^{rd}$, 26$^{th}$, and 27$^{th}$ PDUs are lost during transmission. The receiving side sends a status report regarding the received PDUs to the transmitting side. Here, it is assumed that the status report is sent at the time when the 28$^{th}$ PDU is received. The reported status information provides that among the 21$^{st}$ to 28$^{th}$ PDUs, the 23$^{rd}$, 26$^{th}$, and 27$^{th}$ PDUs have not been properly received, and other PDUs have been properly received.

Upon receiving the status report from the receiving side, the transmitting side deletes the successfully transmitted PDUs from the re-transmission buffer, then updates the transmitting window, and prepares re-transmission of the transmission-failed PDUs. Namely, after deleting the 21$^{st}$, 22$^{nd}$, 24$^{th}$, 25$^{th}$, and 28$^{th}$ PDUs (i.e., the properly transmitted PDUs) from the re-transmission buffer, the transmitting side maintains the 23$^{rd}$, 26$^{th}$, and 27$^{th}$ PDUs in the re-transmission buffer and prepares for re-transmission. In FIG. 5, it is assumed that PDUs are additionally constructed (up to the 34$^{th}$ PDU) after the PDUs (up to the 28$^{th}$ PDU) have been properly transmitted. As PDU transmission occurs sequentially, the 23$^{rd}$, 26$^{th}$, and 27$^{th}$ PDUs are re-transmitted and then the 29$^{th}$ to 32$^{nd}$ PDUs are transmitted for the first time. Here, because the 33$^{rd}$ and 34$^{th}$ PDUs are outside the range of the transmitting window, they are stored in the transmission buffer and await subsequent transmission.

Following the above-explained procedure, the receiving side sequentially receives PDUs. If the 23$^{rd}$ PDU is received (as a result of re-transmission from the transmitting side), the start point of the receiving window is moved to the SN (i.e., SN=26) of the PDU to be received first in-sequence, because the 24$^{th}$ and 25$^{th}$ PDUs were already properly received. Namely, at the time of receiving 23$^{rd}$ PDU, the receiving window is updated to 26~36. Once 26$^{th}$ PDU is received, the receiving window is again updated to 27~37.

However, if the 27$^{th}$ PDU is not received thereafter, but the 29$^{th}$ PDU is received instead, the receiving window maintains its range as 27~37 and is not updated. FIG. 5 shows that the 27$^{th}$, 30$^{th}$, and 31$^{st}$ PDUs are not received among the PDUs up to the 32$^{nd}$ PDU. Specifically, the 27$^{th}$ PDU failed to be transmitted twice (that is, one re-transmission failed). When receiving the 32$^{nd}$ PDU, assuming that the receiving side sends a status report, the receiving side having received the PDUs up to the 32$^{nd}$ PDU will send a status report indicating the failure to receive the 27$^{th}$, 30$^{th}$, and 31$^{st}$ PDUs.

Discard of SDU

Assuming that transmission of the 23$^{rd}$ PDU continues to fail, if the PDUs as shown in FIG. 5 are constructed with the SDUs in FIG. 2, the transmission failure of the 23$^{rd}$ PDU means that the 35$^{th}$ and 36$^{th}$ SDUs will also have transmission failures. The discarding of SDUs differs for the timer scheme and for the limited number of re-transmissions scheme, thus these will be explained in more detail as follows.

Upon receiving an SDU from a higher layer, the AM RLC immediately operates a discard timer for the SDU. Here, the discard timer operates for each SDU. The discard timer stops operating the moment the SDU is successfully transmitted and the discard timer assigned to that SDU is removed (expires). Here, 'successfully transmitted' means that an ACK signal (informing that all PDUs having at least a portion of an SDU have been successfully received) is received from the receiving side. As the SDUs are sequentially delivered to the RLC, the discard timer sequentially expires as well. In FIG. 2, if the 23$^{rd}$ PDU is not successfully transmitted by the time the discard timer of the 35$^{th}$ SDU expires, the 35$^{th}$ SDU is discarded at the moment when the discard timer expires.

Here, it is important to note that the SDU is discarded, and not the PDU. Since a PDU is constructed with segmented and/or concatenated SDUs, one SDU may be entirely within one PDU or one SDU may span across several PDUs. In any case, the discard of the SDU means that all corresponding portions of the SDU are discarded from all PDUs that contain any portion of that SDU.

For example, referring back to FIG. 2, even if the 22$^{nd}$ PDU succeeds in transmission, a transmission failure of the 23$^{rd}$ PDU results in the discarding of the 35$^{th}$ SDU. Hence, a portion of the 35$^{th}$ SDU in the 22$^{nd}$ PDU is discarded as well. Moreover, it is also important to note that the 23$^{rd}$ PDU is not discarded even if the 35$^{th}$ SDU is discarded. Having a portion of the 36$^{th}$ SDU as well as a portion of the 35$^{th}$ SDU, the 23$^{rd}$ PDU continues to be re-transmitted until the discard timer of the 36$^{th}$ SDU expires. Even if the 23$^{rd}$ PDU is re-transmitted while the 35$^{th}$ SDU has been discarded, the re-transmission does not exclude the portion of the 35$^{th}$ SDU. The construction of the re-transmitted PDU should be equal to that of the originally transmitted PDU.

When SDUs are delivered down from a higher layer, they may descend simultaneously despite sequential delivery. If the 35$^{th}$ and 36$^{th}$ SDUs are delivered almost simultaneously, the discard timers of the 35$^{th}$ and 36$^{th}$ SDUs may expire almost at the same time. In such a case, the 35$^{th}$ and 36$^{th}$ SDUs are discarded almost at the same time, and re-transmission of the 23$^{rd}$ PDU is interrupted as well as that of the 24$^{th}$ PDU that includes the 36$^{th}$ SDU. As the 25$^{th}$ PDU includes a portion of the 37$^{th}$ SDU of which the discard timer has yet to expire, the 25$^{th}$ PDU continues to be re-transmitted until the discard timer of the 37$^{th}$ SDU expires. As mentioned in the foregoing explanation, a construction of the re-transmitted 25$^{th}$ PDU is the same as that of the originally transmitted PDU.

The discard method using the timer scheme performs the discard of SDUs using the expiration of the discard timer, by which the discard of SDUs occurs sequentially. However, in the limited number of re-transmissions scheme, an SDU is discarded if the PDU that has been re-transmitted (as many times as the maximum (limit) number of re-transmission scheme allows) is not successfully transmitted. Hence, unlike in the timer scheme, all SDUs including at least a portion of the corresponding PDU are simultaneously discarded according to the limited number of re-transmissions scheme.

For example, as shown in FIG. 2, if the 23$^{rd}$ PDU fails to be properly transmitted even when the maximum (limit) number of re-transmissions is reached, the 35$^{th}$ and 36$^{th}$ SDUs are simultaneously discarded. However, because this scheme is also for discarding SDUs, the procedures thereafter are the same of those of the timer scheme in that two SDUs are discarded at almost the same time. Namely, a corresponding portion of the 22$^{nd}$ PDU is discarded due to the discarding of the 36$^{th}$ SDU, while the 24$^{th}$ PDU is discarded due to the discarding of the 36$^{th}$ SDU, despite the fact that the re-transmissions of the 24$^{th}$ PDU has yet to be completed because the maximum (limit) number of re-transmissions has not yet been reached. However, the 25$^{th}$ PDU including the 37$^{th}$ SDU therein continues to be re-transmitted until the maximum (limit) number of re-transmissions is reached.

Transmission of SDU Discard Information

A MRW procedure that is directly related to the present invention is explained as follows. After discarding an SDU, the transmitting side AM RLC informs the receiving side of the discarded SDU through a MRW command for moving the receiving window. In this case, the MRW command does not directly indicate the position to which the receiving window should move, but only informs the SDU discard information, whereby the receiving side moves the receiving window to an appropriate position based on the discard information.

Information that indicates an end portion of the SDU discarded by the transmitting side is included in the MRW command that is transmitted by the transmitting side. In order to indicate the end portion of the SDU, the MRW command should include information related 'to which PDU the end portion of the SDU belongs' and 'to which portion in the PDU the end portion of the SDU belongs'. Hence, the MRW command consists of a SN of PDU to which the end portion of the discarded SDU belongs, and an indicator indicating an end of the discarded SDU in the PDU.

When at least two SDUs are discarded, the MRW command carries information about the last discarded SDU. This is because the position to which the receiving window has to move is located after the end of the last discarded SDU. Moreover, as explained in the foregoing description, when a certain SDU is discarded, all SDUs between the start point of the transmitting window and the corresponding SDU are discarded as well. Hence, the receiving side only receives the information of the last discarded SDU so as to know what SDUs have been discarded at the transmitting side.

When a higher layer requests information about other discarded SDUs, as well as the information of the last discarded SDU, the MRW command can optionally inform such information. However, for the other SDUs, instead of the last SDU, the SN of the PDU (where the end portion of the discarded SDU exists) is informed, but an indicator indicating an end of the corresponding SDU in the PDU is not informed. This is because the information about the other discarded SDUs does not affect the receiving window movement, and because these other SDUs are consecutively discarded.

FIG. 6 is a conceptual diagram of the structure of a MRW command, in which 'N' is the number of discarded SDU information that is carried by MRW command, and the current UMTS standard set this number to be a maximum of 15.

Referring to FIG. 6, a basic MRW command contains information about an end portion of the N$^{th}$ discarded SDU. Additionally, another discard information about the SDUs between 1 to N−1 (i.e., SDU 1 to SDU (N−1)) can be optionally added.

In FIG. 6, the uppermost field is the number of the PDU SNs included in the MRW command and is equal to 'N'. It is important to note that N is not the number of SDUs substantially discarded in the transmitting side, but the number of SDU discard information carried in the corresponding MRW command.

Namely, if the MRW command includes the SN of PDU where an end portion of the N$^{th}$ SDU exists, the MRW command includes one SDU discard information, such that the count is 1. When including all discard information of 1$^{st}$ to N$^{th}$ SDUs, the MRW command includes N SDU discard information so that the number is N. The reason why a value of N is notified is that the receiving side is informed whether optional SDU discard information of 1~(N−1) exists or not when receiving the MRW command. Also, indicator information that indicates where the end portion of the N$^{th}$ SDU is located within the PDU, is always included at the end of the MRW command.

Referring to FIGS. 2 and 5, an example of how a MRW command may be actually structured is explained as follows. First, it is assumed that the 23$^{rd}$ PDU is not successfully transmitted continuously or for an extended period of time, such that the 35$^{th}$ and 36$^{th}$ SDUs are simultaneously discarded. In this case, a start point of the transmitting window is at the 23$^{rd}$ PDU as explained in the foregoing description. In such a case, the MRW command is configured as shown in FIG. 7.

Namely, if the 35$^{th}$ and 36$^{th}$ SDUs are discarded due to the transmission failure of the 23$^{rd}$ PDU, the MRW command for this situation consists of PDU SN=23 of discard information of the 35$^{th}$ SDU, PDU SN=25 of discard information of the 36$^{th}$ SDU, and an indicator indicating an end of the 36$^{th}$ SDU. Here, as explained in the foregoing description, the discard information of the 35$^{th}$ SDU can be optionally inserted by a request of the higher layer and a count (number) field value of the uppermost PDU SN is correspondingly adjusted.

Moving the Receiving Window and Transmitting Move Information

Upon receiving a MRW command, the receiving side discards all SDUs from an SDU existing at a start point of a receiving window to a last SDU informed by the MRW command, and correspondingly moves the receiving window. The moved position of the receiving window varies according to whether the PDUs (that include the SDUs after the discarded SDU) are received or not.

In any case, the basic principle is that the start point of the receiving window is moved to the SN of the PDU that is first received in-sequence after excluding the discarded SDUs. Hence, the moved position of the receiving window may be the PDU that includes an end portion of the last discarded SDU informed by the MRW command or the PDU that follows after subsequent PDUs have been successfully received. The receiving side consecutively discards the SDUs from the start point of the receiving window to correspond to the MRW command, moves the receiving window, and then informs the transmitting side of the moved position of the receiving window. In this case, the start point of the receiving window is the SN of the PDU to be first received in-sequence.

The moved position of the receiving window is explained by reference to the MRW command in FIG. 7 as an example. Referring back to FIG. 5, the receiving side successfully receives all PDUs up to the $22^{nd}$ PDU, but fails to receive the $23^{rd}$ PDU, whereby the start point of the receiving window is the $23^{rd}$ PDU. Assuming that the $24^{th}$ to $28^{th}$ PDUs are successfully received, if the MRW command shown in FIG. 7 is received, the receiving side discards all the SDUs from the start point of the receiving window up to the last discarded SDU. Namely, all SDUs from the $35^{th}$ SDU corresponding to the start point of the receiving window up to the $36^{th}$ SDU (which is the last PDU informed by the MRW command) are discarded. Specifically, in FIG. 2, an end portion of the $22^{nd}$ PDU (that includes the $35^{th}$ SDU) is discarded, the $23^{rd}$ PDU fails to be received, the $24^{th}$ PDU is entirely discarded, and a beginning portion of the $25^{th}$ PDU (that includes $36^{th}$ SDU) is discarded.

Thereafter, the PDUs up to the $28^{th}$ are successfully received, whereby the start point of the receiving window moves to the $29^{th}$ PDU to be first received in-sequence. The receiving side then notifies the transmitting side that the receiving window has moved to the $29^{th}$ PDU.

In particular situations, the position of the receiving window may already proceed further than the PDU specified by the MRW command. Such a situation occurs when the ACK information is lost during transmission, even if the receiving side having properly received the PDU sends the ACK information to the transmitting side. In this case, the receiving side successfully received the PDU and correspondingly updated the receiving window. Yet, the transmitting side fails to receive ACK information for the transmitted PDU, thereby failing to update its receiving window. Hence, the start point of the receiving window is behind the start point of the transmitting window.

For example, referring to FIG. 7, the receiving side successfully received all the PDUs up to the $28^{th}$ PDU and updated the start point of the receiving window to the $29^{th}$ PDU. However, the ACK information for the $23^{rd}$ PDU is consecutively lost during transmission, whereby the start point of the transmitting window may be held at the $23^{rd}$ PDU. In this case, if the transmitting side discards the $35^{th}$ and $36^{th}$ SDUs, and transmits the SDU discard information to the receiving side, the SDU discard information is of no use, because the receiving window of the receiving side has already been moved to the $29^{th}$ PDU.

Hence, when the receiving window has already moved, i.e., when the discard information of the corresponding SDU is received after the successfully received SDU is delivered to the higher layer, the receiving side ignores this information and informs the transmitting side of a current position of the receiving window. Yet, the receiving side may not discard the SDU that was discarded by the transmitting side. Namely, if the discard information for the SDU that was successfully received and delivered to the higher layer is received, the corresponding SDU cannot be discarded because the corresponding SDU was already delivered to the higher layer. The receiving side may only inform the higher layer of the information that the corresponding SDU was discarded in the transmitting side.

Transmitting Window Move

Upon receiving the window move information from the receiving side, the transmitting side moves the start point of the transmitting window to the same position as the start point of the receiving window. The PDU corresponding to the start point of the transmitting window may be already transmitted before the receiving window move information. In such case, the transmitting side does not transmit the corresponding PDU and awaits the ACK/NACK status report from the receiving side. If the PDU corresponding to the start point of the transmitting window is not transmitted beforehand, the transmitting side starts to transmit from the corresponding PDU.

In the related art method, after receiving the MRW command, the receiving side discards all SDUs from the start point of the receiving window up to the last discarded SDU informed by the MRW command, whereby various problems are created if the SDUs are discontinuously discarded in the transmitting side.

FIG. 8A is a diagram of explaining how a discontinuous SDU discard takes place in normal data transmitting and receiving.

First, assuming that the PDUs up to the $20^{th}$ PDU are successfully transmitted, the start points of transmitting and receiving windows may be located at the $21^{st}$ PDU. If the SDUs are delivered to the transmitting side RLC while such a status is maintained, the RLC segments and/or concatenates the SDUs to construct PDUs and then transmits the constructed PDUs to the receiving side.

FIG. 8A is a diagram of transmitting the $21^{st}$ to $28^{th}$ PDUs from the transmitting side. In this case, the PDUs up to the $30^{th}$ PDU can be substantially transmitted. Yet, the SDUs are sequentially delivered down to RLC. Hence, it is assumed that the PDUs from the $29^{th}$ PDU are not constructed yet at the moment of transmission from the transmitting side.

In FIG. 8A, the receiving side fails to receive the $23^{rd}$, $26^{th}$, and $27^{th}$ PDUs among the $21^{st}$ to $28^{th}$ PDUs transmitted through the above-described process, because of losses during transmission and succeeds in receiving the rest of the PDUs. After successfully receiving the $21^{st}$ and $22^{nd}$ PDUs, the receiving side updates the start point of the receiving window to the $23^{rd}$ PDU. Yet, no additional receiving window updating takes place since the $23^{rd}$ PDU has not been received. Once the receiving side transmits status information for the $21^{st}$ to $28^{th}$ PDUs to the transmitting side, the transmitting side deletes the $21^{st}$, $22^{nd}$, $24^{th}$, $25^{th}$, and $28^{th}$ PDUs from a buffer, updates the start point of the transmitting window to the $23^{rd}$ PDU, and then awaits subsequent transmission.

FIG. 8B is a diagram explaining a procedure of the transmitting side for updating the transmitting window to 23~33, and then performs subsequent transmission. Here, the PDUs are transmitted in order of the $23^{rd}$, $26^{th}$, $27^{th}$, $29^{th}$, $30^{th}$, $31^{st}$, and $32^{nd}$ PDUs, wherein the $23^{rd}$, $26^{th}$, and $27^{th}$ PDUs require re-transmission. It should be noted that even though the PDUs from the $33^{rd}$ PDU are constructed, they cannot be transmitted due to the size limitation of the transmitting window.

Assuming that the receiving side still fails to receive the $23^{rd}$ and $27^{th}$ PDUs among the transmitted $23^{rd}$ to $32^{nd}$ PDUs, and further fails to receive the $30^{th}$ and $31^{st}$ PDUs. Since the $23^{rd}$ PDU is not received, the receiving window, a shown in FIG. 8B, maintains its current range of 23~33.

Once the status information of the $23^{rd}$ to $32^{nd}$ PDUs is transmitted to the transmitting side, the transmitting side deletes the PDUs succeeding in transmission from the buffer. Yet, since the ACK for the $23^{rd}$ PDU is not received, updating of the transmitting window fails to take place like in the receiving side. Hence, the transmitting side, as shown in FIG. 8C, re-transmits the $23^{rd}$, $27^{th}$, $30^{th}$, and $31^{st}$ PDUs while maintaining the transmitting window at a range of 23~33.

If the receiving side keeps failing to receive the 23$^{rd}$ and 27$^{th}$ PDUs, since the 23$^{rd}$ and 27$^{th}$ PDUs remain within the range of the transmitting window, the transmitting side fails to transmit additional PDUs, and only re-transmits the 23$^{rd}$ and 27$^{th}$ PDUs. Thereafter, assuming that 23$^{rd}$ and 27$^{th}$ PDUs continue to be re-transmitted, but ultimately fail to be properly transmitted, the transmitting side then discards the corresponding SDUs due to the discard timer expiration for SDU or the maximum (limit) number of re-transmissions has been reached.

FIG. 9 is a diagram of discontinuously discarding 35$^{th}$, 36$^{th}$, 38$^{th}$, and 39$^{th}$ SDUs due to transmission failure of 23$^{rd}$ and 27$^{th}$ PDUs. Referring to FIG. 9, in case of discontinuously discarding SDUs, in order to move a receiving window using the MRW procedure, one of the following two methods is used.

A. Method of Sequentially Executing MRW Procedures as Many Times as the Number of Sets of Continuously Discarded SDUs When SDUs are discontinuously discarded, this method regards the continuously discarded SDUs as one set, and executes one MRW procedure for each continuously discarded SDUs set to move a receiving window sequentially. Namely, referring to FIG. 9, the transmitting side regards the 35$^{th}$ and 36$^{th}$ SDUs as one set, and the 38$^{th}$ and 39$^{th}$ SDUs as another set, and then performs the MRW procedure on each of the two sets. Since the MRW procedures are performed one-by-one at any one moment, they cannot be simultaneously executed but is sequentially executed one after the other. Such a procedure is explained in more detail by referring to FIG. 10.

First, the transmitting side executes a first MRW procedure while the transmitting window is between 23~33. The transmitting side discards all SDUs from the start point of the transmitting window to the 36$^{th}$ SDU, and transmits such information to the receiving side using a MRW command (S1, S2). The receiving side discards all SDUs from the start point of the receiving window to the last discarded SDU informed by the received MRW command, i.e., the 36$^{th}$ SDU, and then moves the receiving window to 27~37 (S3).

Thereafter, the receiving side informs the transmitting side of a moved position of the receiving window (S4). The transmitting side then terminates the first MRW procedure and moves the transmitting window to 27~37 in order to correspond with the moved position of the receiving window. The transmitting side then executes a second MRW procedure to move the receiving window after the 39$^{th}$ SDU (S5).

Another MRW command transmitted in the second MRW procedure includes the discard information of the 39$^{th}$ SDU that is the last discarded SDU of a second discontinuous discarded SDU set. It should be noted that, since the transmitting window is moved to 27~37 while the second MRW procedure is in progress, the 33$^{rd}$ to 36$^{th}$ PDUs can be transmitted (S6). After discarding all the SDUs from the start point of the receiving window to the last discarded SDU informed by the received MRW command, i.e., the 39$^{th}$ SDU, the receiving side moves the start point of the receiving window to an "appropriate" position between 33~37 (S7). In this case, the 33$^{rd}$ to 36$^{th}$ PDUs can be transmitted while the second MRW procedure is performed, whereby the position of the receiving window is referred to as being "appropriate" because such position varies depending upon whether these PDU are received.

For instance, if there is no additional PDU reception while the second MRW procedure is in progress, the receiving window is updated to 33~43. If all of the 33$^{rd}$ to 36$^{th}$ PDUs are received, the receiving window is updated to 37~47. Namely, the transmittable PDUs can be transmitted during the MRW procedure, whereby the reception of such PDUs changes (updates) the position of the receiving window. This is the same as in the first MRW procedure. Yet, since there are no transmittable PDUs except the 23$^{rd}$ and 27$^{th}$ PDUs between the range of 23~33 of the receiving window in the example of FIG. 8, the start point of the receiving window was defined as 27.

After moving the start point of the receiving window to the appropriate position, the receiving side transmits transmitting window move information to the transmitting side (S8). The transmitting side having received the transmitting window move information terminates the second MRW procedure and moves the start point of the transmitting window to correspond with that of the receiving window (S9). The transmitting window is then used to continue transmission from the PDU at the start point of the transmitting window (S10).

B. Method of Discarding all PDUs Between Discontinuously Discarded SDUs

FIG. 11 is a flowchart of moving a receiving window using this method (method B) when the discontinuous SDU discard as shown in FIG. 9 takes place.

In method B, when SDUs are discontinuously discarded, the transmitting side discards all SDUs from one SDU corresponding to the start point of the transmitting window up to the last one of the discarded SDUs, regardless of transmission success or failure such that the SDUs from the start point of the transmitting window up to last SDU are continuously discarded. Namely, if the SDUs are discontinuously discarded as shown in FIG. 9, the transmitting side discards all SDUs from the 35$^{th}$ SDU of the start point of the transmitting window up to the 39$^{th}$ SDU of the last discarded SDU, and sends such information to the receiving side (S11, S12). In this case, the 37$^{th}$ SDU is discarded despite succeeding in transmission. The receiving side having received an MRW command regards all SDUs from the start point of the receiving window up to the 39$^{th}$ SDU as discarded, so as to discard the corresponding SDUs, and then moves the receiving window beyond the 39$^{th}$ SDU (S13). In this case, the 37$^{th}$ SDU is discarded despite the transmission success at the transmitting side.

Thereafter, the receiving side informs the transmitting side of the moved position of the receiving window (S14). The transmitting side having received the moved position terminates the MRW procedure and moves the transmitting window to 33~44 (S15). The transmitting side then starts transmission from the 33$^{rd}$ PDU of the start point of the transmitting window (S16).

As explained in the above description, when discontinuous SDU discard takes place, the receiving window is moved by using one of the two methods, methods A or B in the related art. However, the related art methods A and B have the following problems or disadvantages.

First, in method A, the MRW procedures are sequentially executed several times to inform the receiving side of the discontinuous SDU discard, whereby considerable time delay takes place in processing subsequent SDUs. Namely, the PDU after the 37$^{th}$ PDU is transmittable after the second MRW procedure has been performed in the examples of FIG. 9 and FIG. 10, whereby the SDUs involved in the second MRW procedure should be stored in the RLC buffer for a considerable time. Typically, it takes at least 150 ms to finish one MRW procedure. If the receiving window is moved according to method A, the MRW procedure undesirably interrupts high-speed data communication. When using the SDU discard method based on the timer scheme, the SDUs fail to be transmitted and continue to be discarded in the worst-case scenario.

Moreover, in using method B, when the SDUs are discontinuously discarded, the receiving side discards the SDUs that were successfully transmitted as well, which undesirably reduces transmission efficiency. Namely, in the example of FIG. 9, only the 37$^{th}$ SDU is unnecessarily discarded, and thus the transmission efficiency is not greatly reduced. However, in other extreme examples, if the SDUs corresponding to the start and end points of the transmitting window are discarded, all SDUs in the transmitting window are discarded, which significantly reduces transmission efficiency.

SUMMARY OF THE INVENTION

Accordingly, the present invention is directed to a method of moving a receiving window in a wireless mobile communication system that substantially obviates one or more problems due to limitations and disadvantages of the related art.

An object of the present invention is to provide a method of moving a receiving window in a wireless mobile communication system, which enables to reduce transmission delay that takes place in case of moving the receiving window if SDUs are discontinuously discarded.

Another object of the present invention is to provide a method of moving a receiving window in a wireless mobile communication system, which enables to reduce the degradation of transmission efficiency generated by moving the receiving window when SDUs are discontinuously discarded.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purposes of the invention, as embodied and broadly described herein, a data communication method according to the present invention includes, receiving a move receiving window (MRW) command; and delivering successfully received service data units (SDUs) among data units from a start point of a current receiving window to a position indicated by the MRW command to an upper layer.

Preferably, the MRW command is transmitted through a radio environment.

Preferably, the data units are service data units (SDUs) of a data link layer.

Preferably, the data units are radio link control (RLC) SDUs.

Preferably, the SDUs are identified by a SDU boundary indicator.

Preferably, the SDU boundary indicator is included in a protocol data unit (PDU) of a data link layer.

Preferably, the SDUs that are not yet successfully received are discarded.

Preferably, the position that is indicated by the MRW command indicates an end point of the SDU to be discarded last.

Preferably, the steps are performed in a receive-response mode.

Preferably, the MRW command includes a sequence number of a protocol data unit (PDU) with an end point of the SDU discarded last; and an end point indicator indicating the end point of the SDU in the PDU.

Preferably, the method further comprising moving the receiving window to the position indicated by the MRW command.

Preferably, the moving of the receiving window is performed in a data link layer.

In another aspect of the present invention, a method for moving a receiving window in a wireless mobile communication system includes receiving an information of a last discarded service data unit (SDU) from a transmitting side; checking whether the SDUs prior to the last discarded service data unit are successfully received; and delivering the SDUs that are successfully received to a upper layer and moving a receiving window in accordance with the information.

Preferably, the SDU is a radio link control (RLC) SDU.

Preferably, the information for the last discarded SDU includes a sequence number of a protocol data unit (PDU) with an end point of the SDU discarded last; and an end point indicator indicating the end point of the SDU in the PDU.

Preferably, the moving of the receiving window is performed in a data link layer.

Preferably, the receiving window moves to the PDU including the end point of the last discarded SDU.

Preferably, the SDUs are identified by the end point indicator

Preferably, the checking step comprises identifying data from a portion indicated by one SDU end point indicator to a portion indicated by an adjacent SDU end point indicator as one SDU; and judging the corresponding SDU as successfully received if all portions of the identified SDU are received.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram of an example of constructing a PDU from SDU(s);

FIG. 3 is a diagram of explaining the 21$^{st}$ to 23$^{rd}$ AMD PDUs among the constructed AMD PDUs in FIG. 2;

FIG. 6 is a diagram of a concept of a construction of a MRW command;

FIG. 7 is a diagram of a MRW command format;

FIG. 9 is a diagram of an example of discarding SDUs discontinuously;

DETAILED DESCRIPTION OF THE PREFERRED EMBODIMENTS

Reference will now be made in detail to the preferred embodiments of the present invention, examples of which are illustrated in the accompanying drawings.

The present invention is implemented in a mobile communication system such as a UMTS (universal mobile telecommunications system) developed by the 3GPP. However, the present invention is further applicable to communication systems operating under other standards.

In the present invention, when SDUs are discarded, the AM RLC of the transmitting side transfers information of the last discarded SDU regardless of the continuity of the discarded SDUs. The AM RLC of the receiving side then checks whether to receive the SDUs from the start point of the receiving window to the last discarded SDU, respectively, and delivers the SDUs that are successfully received to an upper layer, resulting in minimal time delay and minimal reduction of transmission efficiency even if discontinuous SDU discarding take place.

Figure 1:
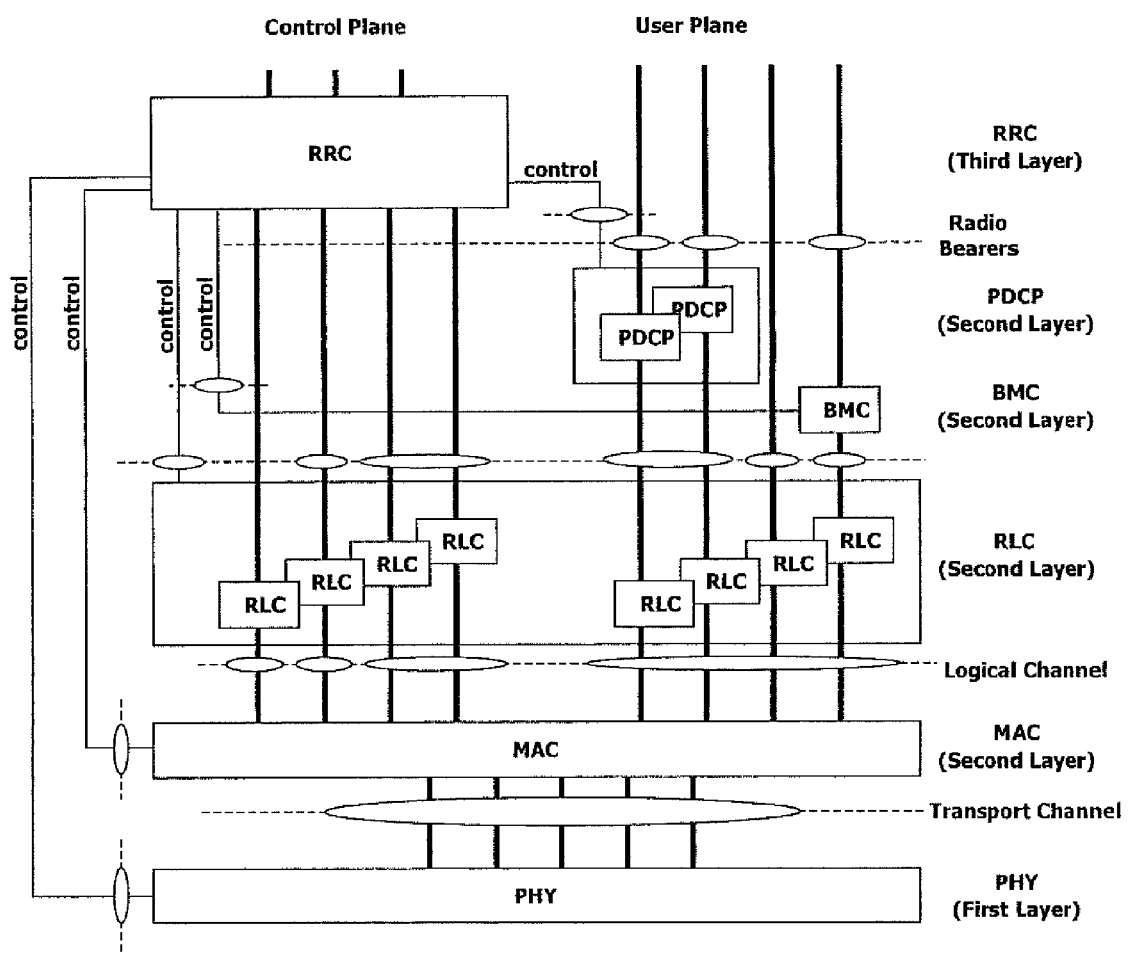
FIG. 1 illustrates a block diagram of an architecture of a radio interface protocol between a terminal and the UTRAN based on 3GPP radio access network standards.
Figure 4:
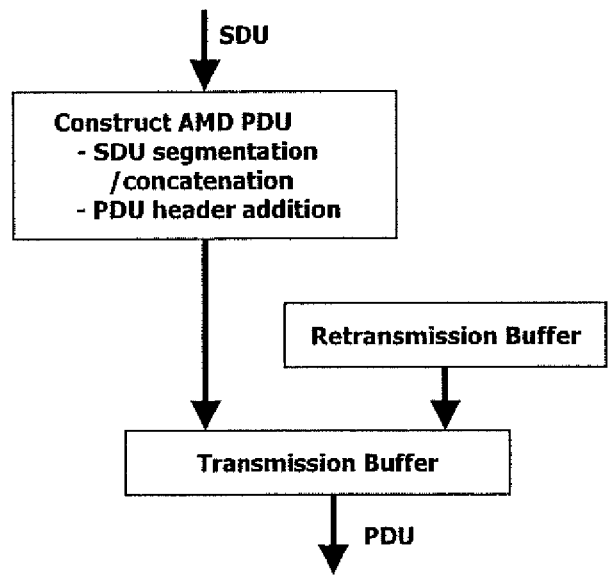
FIG. 4 is a diagram showing how the AM RLC constructs an AMD PDU for storing in transmission and re-transmission buffers.
Figure 5:
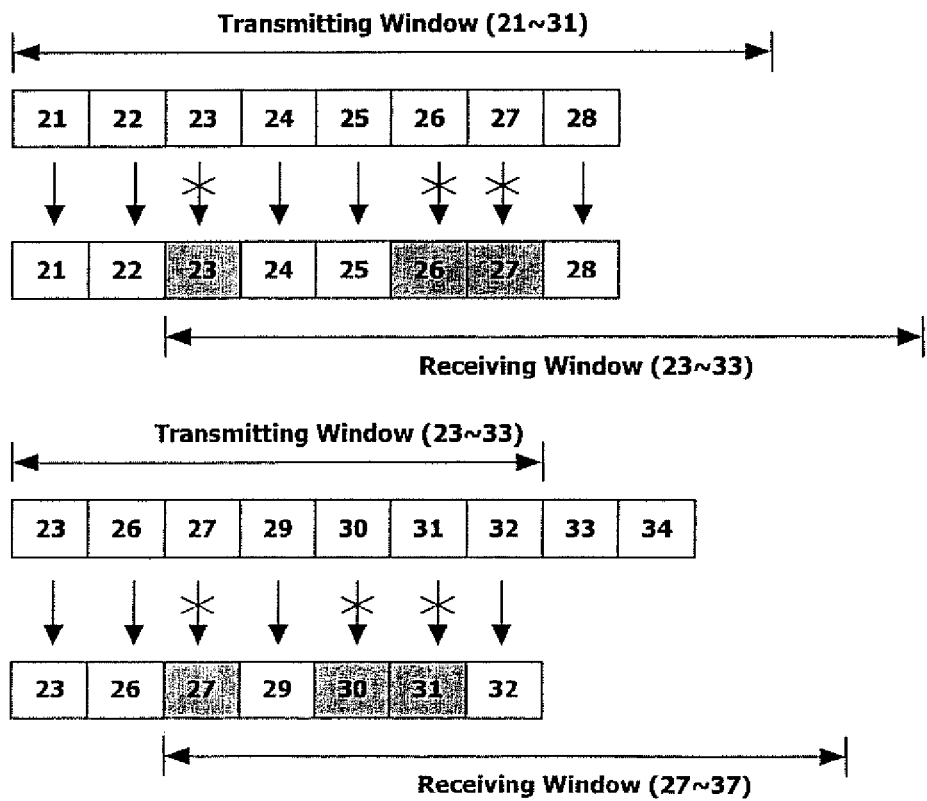
FIG. 5 is a diagram of an example for transmitting/receiving AMD PDUs and updating transmitting/receiving windows.
Figure 8A:
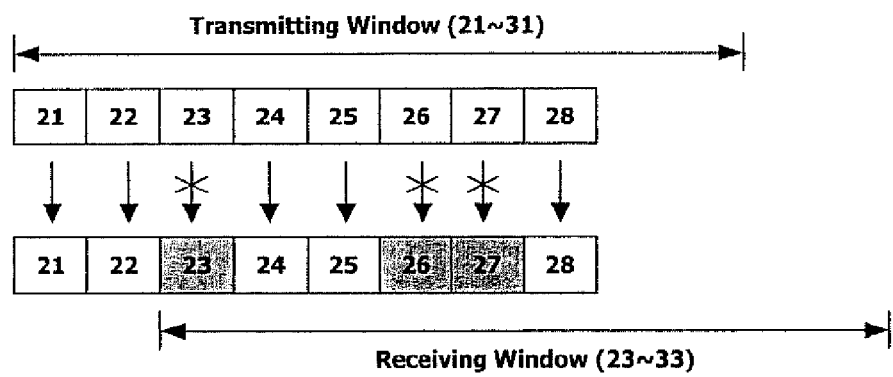
FIGS. 8A to 8C are diagrams of explaining how inconsecutive SDU discard takes place in normal data transmitting/receiving.
Figure 8B:
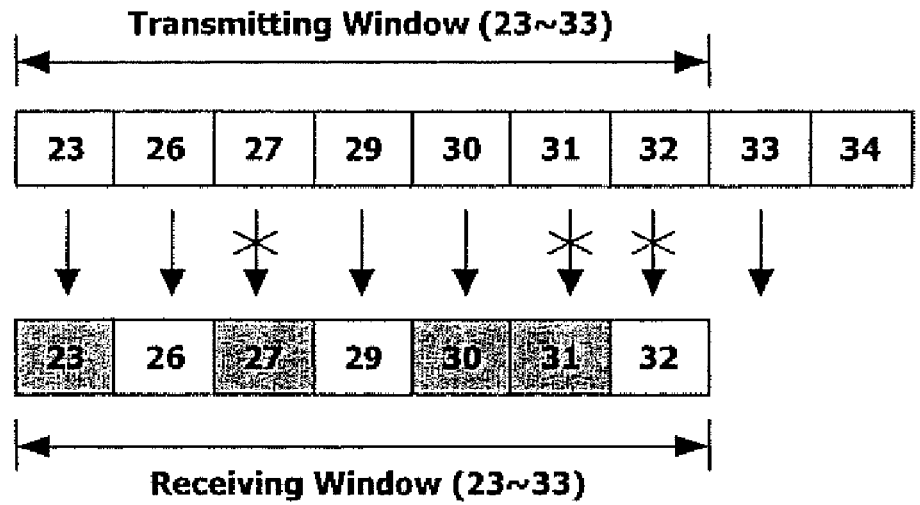
Figure 8C:
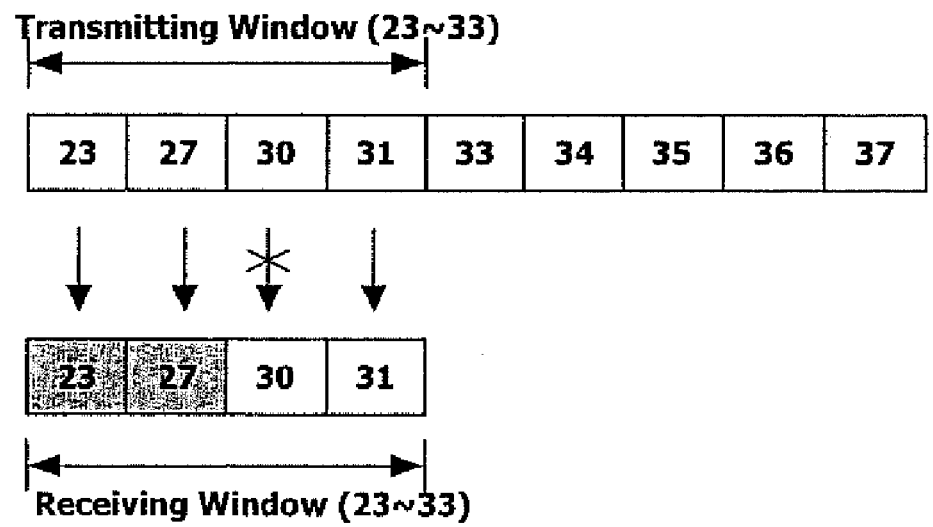
Figure 10:
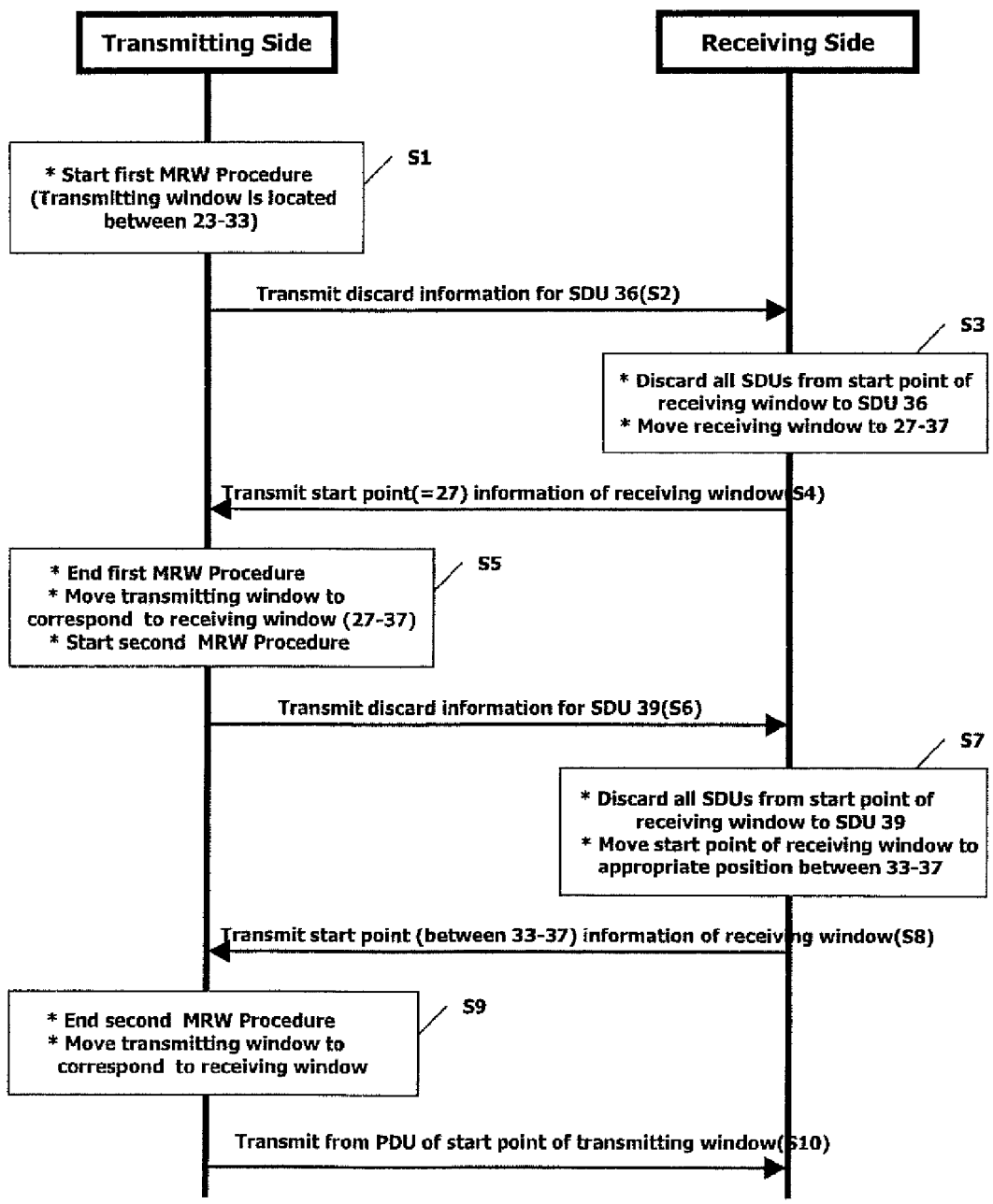
FIG. 10 is a flowchart of a process for moving a receiving window using a first method according to a related art when discarding SDUs discontinuously.
Figure 11:
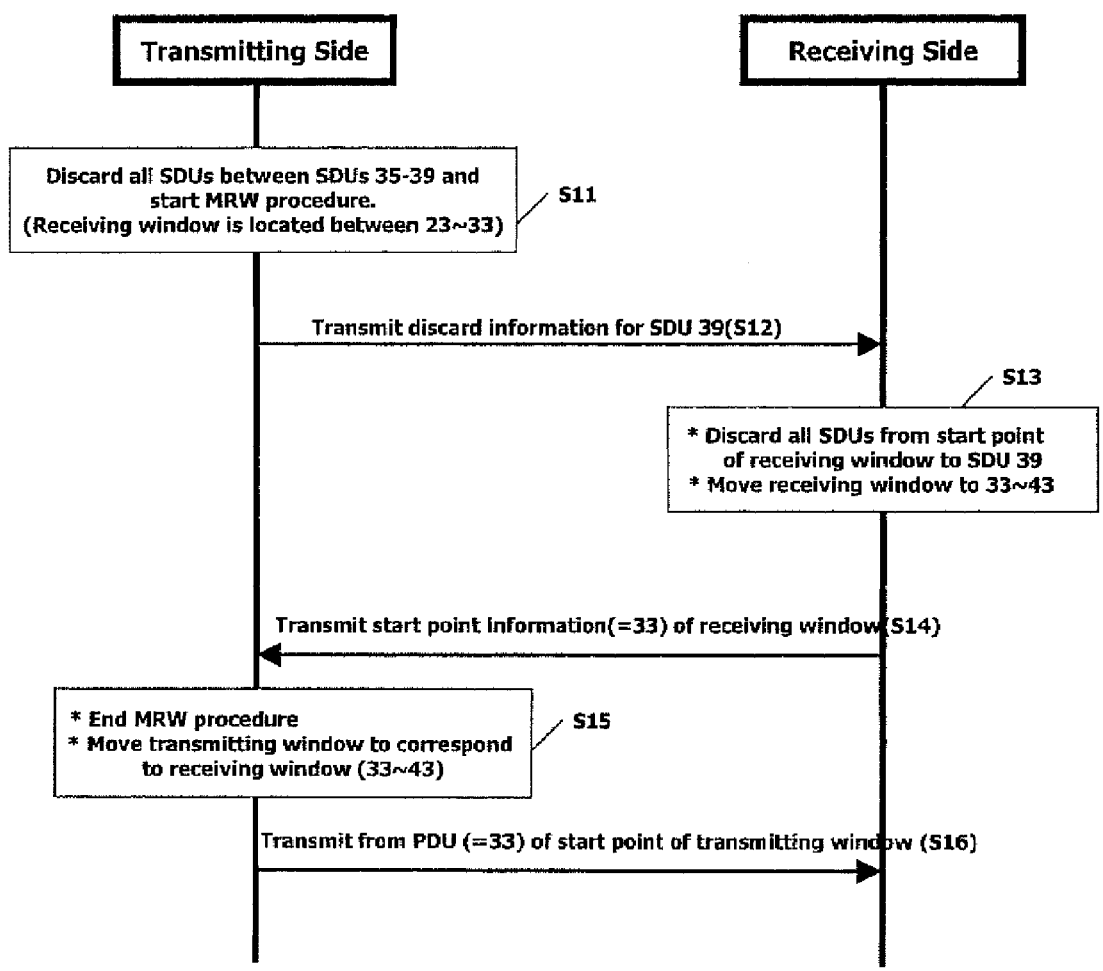
FIG. 11 is a flowchart of a process for moving a receiving window using a second method according to a related art when discarding SDUs discontinuously.

A detailed embodiment of the present invention is applied to the case where SDUs are discarded according to FIG. 9. In this case, it is assumed that the PDU transmitting/receiving process is already in progress described with respect to FIGS. 8A to 8C.

Figure 12:
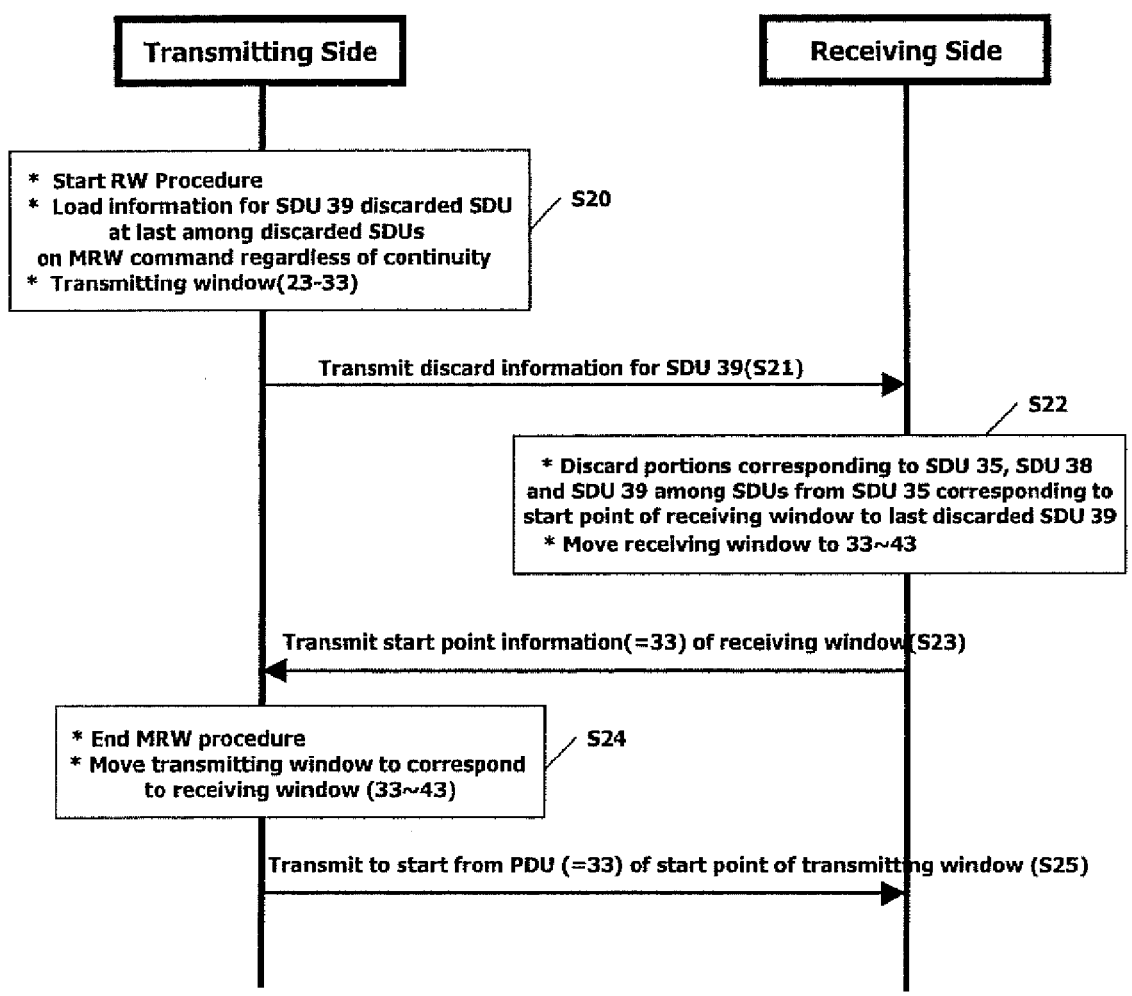
FIG. 12 is a flowchart of a method for moving a receiving window according to the present invention when discarding SDUs discontinuously.

FIG. 12 is a flow chart of a method for moving a receiving window according to the present invention when discarding SDUs discontinuously.

First, if SDUs are discarded according to FIG. 9, the transmitting side RLC executes a MRW procedure, and then adds to the MRW command, information of the $39^{th}$ SDU that is the last one of the discarded SDUs for transmission to the receiving side RLC (S20, S21). In this case, the transmitting window lies between the $23^{rd}$ PDU and the $33^{rd}$ PDU.

If the RLC is set to inform the receiving side of all discarded SDUs, discard information for other SDUs as well as the $39^{th}$ SDU is carried on the MRW command. In this case, the $37^{th}$ SDU is successfully transmitted and is not discarded. Hence, discard information of the $37^{th}$ SDU is not carried on the MRW command.

Upon receiving the MRW command, the receiving side extracts the discard information of the SDU located at a last position in the SDU discard information carried on the MRW command. By checking a first PDU SN count field, the portion of the information of the last discarded SDU can be obtained. In the example of FIG. 9, from the MRW command, the receiving side recognizes the information that the transmitting side discarded SDUs up to a first portion of the $28^{th}$ PDU.

The receiving side checks all PDUs from the $23^{rd}$ PDU as the start point of the receiving window up to the $28^{th}$ PDU informed of by the MRW command to determine whether the SDUs are correctly received, and then selectively discards certain SDUs (S22). The receiving side determines which SDUs have been successfully received by using a boundary indicator, namely, a length indicator (LI) included in a PDU header.

As the length indicator (LI) indicates the boundary between SDUs, the receiving side regards a portion between two neighboring LIs to be one SDU. If there is a portion of a different SDU between two LIs, the receiving side determines the corresponding SDU as a failure. In one embodiment of the present invention, as the receiving side receives PDUs in the same manner that shown in FIG. 9, the $23^{rd}$ and $27^{th}$ PDUs are not received. Hence, the receiving side determines as follows.

Failing to receive the $23^{rd}$ PDU, the receiving side considers (recognizes) the latter portion of the $22^{nd}$ PDU up to a beginning portion of the $25^{th}$ PDU as one SDU. Since a portion corresponding to the $23^{rd}$ PDU of the recognized SDU fails to be received, the receiving side discards it. The receiving side determines that a following portion corresponding to the $37^{th}$ PDU is successfully received and such is not discarded. Also, the receiving side recognizes the beginning portion of the $26^{th}$ PDU up to a beginning portion of the $28^{th}$ PDU as one SDU. The recognized SDU is discarded because a portion corresponding to the $27^{th}$ PDU has not been properly received.

It is important to note that the receiving side differs from the transmitting side in calculating the total number of the discarded SDUs, if the MRW command only includes the information of the last discarded SDU. Namely, the transmitting side discards four SDUs in the example of FIG. 9. Yet, the receiving side regards that only two SDUs are discarded.

Such a procedure may cause problems in some cases. Thus, if the RLC is set up to deliver the all discarded SDUs information, the transmitting side carries information about each of the discarded SDUs. In this case, the receiving side knows that the end portions of the discarded SDUs exist in the $23^{rd}$, $25^{th}$, $27^{th}$, and $28^{th}$ PDUs, respectively, whereby it can be seen that four SDUs are discarded in the transmitting side.

The MRW command does not directly deliver the number of the discarded SDUs, but rather, the SN of the PDU having the end portion of the discarded SDU. This is to inform the receiving side of a position of the discarded SDU. Namely, in the example of FIG. 9, the receiving side considers that two SDU groups including portions of the $35^{th}$ and $36^{th}$ SDUs, and the other portions of the $38^{th}$ and $39^{th}$ SDUs are discarded. If the end portions of each of the discarded SDUs in not informed, but the number of the discarded SDUs is informed, the receiving side is unable to know how many discarded SDUs exist in the front and the rear portions. For instance, the receiving side may consider that one SDU in the front portion, and three SDUs in the rear portion are discarded or that there are two discarded SDUs in each of the front and rear portions. This is related to a sequence of the discarded SDUs. The discard sequence is significant to some higher layers. Hence, the MRW command informs the PDU SN indicating where the end portion of each of the discarded SDUs exists.

When the MRW command informs the information of the last discarded SDU or the information of all discarded SDUs, the receiving side discards portions corresponding to the $35^{th}$, $36^{th}$, $38^{th}$, and $39^{th}$ SDUs, and delivers the $37^{th}$ SDU to an upper layer. Also, the RLC of the receiving side moves the start point of the receiving window to the $33^{rd}$ PDU to be first received in-sequence.

Thereafter, the receiving side sends information of the start point of the moved receiving window to the transmitting side (S23). The transmitting side having received such information, determines that the MRW procedure is successfully performed, moves the transmitting window to the same position as that of the receiving window, and then initiates a subsequent PDU transmission (S24, S25).

One embodiment of the present invention provides, in a radio access network, a method of discarding service data units by a sending end employing a transmission window and a discard trigger. The method can comprise the steps of, checking all service data units beginning with a first service data unit located at a lower edge of the transmission window up to a final service data unit that was discarded by the discard trigger, and discarding those checked service data units that have not been positively acknowledged.

Here, the checking step can further comprise a step of positively acknowledging any service data units that have been successfully sent to a receiving end.

Also, the above method can further comprise a step of sending, to a receiving end, a command to move a reception window and information of the final service data unit.

Another embodiment of the present invention provides, in a radio access network, a method of discarding service data units by a receiving end employing a reception window. The method can comprise the steps of, receiving a command to move the reception window, checking all service data units beginning with a first service data unit located at a lower edge of the reception window up to a final service data unit indicated in the command, and discarding those checked service data unit that have not been successfully received.

Here, this method can further comprise a step of acknowledging, to a sending end, any service data units that have been successfully received.

As described above, the receiving side of the present invention checks whether all SDUs from the start point of the receiving window up to the last discarded SDU are successfully received, then delivers the SDUs that are successfully received to an upper layer, and discard only the SDUs that are not successfully received.

A method of moving a receiving window according to the present invention overcomes the SDU transmission time delay problems created by moving the receiving window according to the related art, even if the SDUs are discontinuously discarded.

Moreover, the present invention overcomes the reduction of SDU transmission efficiency created by the related art method B, thereby enabling improved high-speed data communications, as well as maximizing data transmission efficiency.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for receiving data in a radio communication system, the method comprising:
    receiving, by a receiving side, a command for controlling a receiving window with a start point from a transmitting side, the command including discard information related to a last discard service data unit (SDU) of SDUs discarded at the transmitting side;
    checking whether SDUs sent from the transmitting side have been received from the start point of the receiving window to a position of the receiving window that is indicated by the command; and
    converting at least one successfully received SDU among the checked SDUs into a corresponding protocol data unit (PDU) for delivery to a higher layer of the receiving side.

2. The method of claim 1, wherein the command indicates PDUs.

3. The method of claim 1, wherein the SDUs delivered to the higher layer are determined by using a boundary indicator included in a PDU.

4. The method of claim 3, wherein the boundary indicator is included in a header of a PDU.

5. The method of claim 1, further comprising moving the start point of the receiving window to the position indicated by the command.

6. A method for moving a receiving window in a radio communication system comprising:
    receiving, by a receiving side, a command for controlling a receiving window with a start point from a transmitting side, the command including discard information used to identify a data unit last discarded at a transmitting side;
    determining whether data units sent from the transmitting side have been successfully received from the start point of the receiving window to a position of the receiving window that is indicated by the command; and
    discarding at least one successfully received data unit from the start point of the receiving window to the position of the receiving window that is indicated by the command.

7. The method of claim 6, wherein the discard information includes a sequence number being used to identify last discarded data unit.

8. A communication device for receiving data in a radio mobile communication system comprising:
    a receiver for receiving protocol data units (PDUs), each of the PDUs including at least a portion of a service data unit (SDU); and
    a processor for:
        receiving a command for controlling a receiving window with a start point from a transmitting side, the command including discard information related to a last discarded SDU of SDUs discarded at the transmitting side;
        checking whether SDUs sent from the transmitting side have been successfully received from the start point of the receiving window to a position of the receiving window indicated by the command; and
        converting at least one successfully received SDU into a corresponding PDU for delivery to a higher layer.

9. The device of claim 8, wherein the command indicates PDUs.

10. The device of claim 8, wherein the processor determines SDUs to be delivered to the higher layer by using boundary indicators included in the PDUs.

11. The device of claim 10, wherein the processor detects the boundary indicators from a header of PDU.

12. The device of claim 8, wherein the processor moves the start point of the receiving window to the position indicated by the command.

13. The device of claim 8, wherein the processor is a part of a data link layer.

14. The device of claim 8, wherein the processor determines whether SDUs prior to the last discarded SDU have been successfully received and delivers the successfully received SDUs to the higher layer.

15. The device of claim 14, wherein the discard information includes a sequence number and an end point indicator, the sequence number being used to identify a PDU including an end point of the last discarded SDU, the end point indicator indicating the end point of an SDU in a PDU.

16. The device of claim 15, wherein the processor is further configured to identify the successfully received SDUs using the end point indicator.

17. The device of claim 14, wherein the discard information includes a first end point indicator and a second end point indicator, wherein the processor identifies, as one SDU, data beginning with a position indicated by the first end point indicator up to a position indicated by the second end point indicator, and determines that the SDU has been successfully received when all portions of the identified SDU have been received.

* * * * *